US010685236B2

(12) United States Patent
Mitra et al.

(10) Patent No.: US 10,685,236 B2
(45) Date of Patent: Jun. 16, 2020

(54) MULTI-MODEL TECHNIQUES TO GENERATE VIDEO METADATA

(71) Applicant: Adobe Inc., San Jose, CA (US)

(72) Inventors: Saayan Mitra, San Jose, CA (US); Viswanathan Swaminathan, Saratoga, CA (US); Somdeb Sarkhel, San Jose, CA (US); Julio Alvarez Martinez, Jr., Stanford, CA (US)

(73) Assignee: Adobe Inc., San Jose, CA (US)

( * ) Notice: Subject to any disclaimer, the term of this patent is extended or adjusted under 35 U.S.C. 154(b) by 140 days.

(21) Appl. No.: 16/028,352

(22) Filed: Jul. 5, 2018

(65) Prior Publication Data

US 2020/0012862 A1 Jan. 9, 2020

(51) Int. Cl.
| | |
|---|---|
| *G06K 9/00* | (2006.01) |
| *G06N 20/00* | (2019.01) |
| *G06F 16/73* | (2019.01) |
| *G06F 16/78* | (2019.01) |
| *G06K 9/62* | (2006.01) |

(52) U.S. Cl.
CPC ......... *G06K 9/00744* (2013.01); *G06F 16/73* (2019.01); *G06F 16/78* (2019.01); *G06N 20/00* (2019.01); *G06K 9/00718* (2013.01); *G06K 9/6256* (2013.01); *G06T 2207/20084* (2013.01)

(58) Field of Classification Search
CPC .......... G06K 9/00744; G06K 9/00718; G06K 9/6256; G06F 16/73; G06F 16/78; G06F 17/30823; G06F 17/30817; G06F 15/18; G06N 5/046; G06T 2207/20084; H04N 21/26241; H04N 21/466; H04N 21/8549

USPC ........................................................ 382/100
See application file for complete search history.

(56) References Cited

U.S. PATENT DOCUMENTS

| | | | |
|---|---|---|---|
| 2007/0255755 A1* | 11/2007 | Zhang | ..................... G06F 16/78 |
| 2014/0074866 A1* | 3/2014 | Shah | ...................... G06F 16/78 |
| | | | 707/749 |
| 2017/0186044 A1* | 6/2017 | Tal-Israel | ........... G06Q 30/0269 |
| 2018/0276479 A1* | 9/2018 | Harris | .................. H04N 21/233 |

(Continued)

OTHER PUBLICATIONS

Abu-El-Haija, Sami, et al., YouTube-8M: A Large-Scale Video Classification Benchmark, Google Research, Sep. 27, 2016, 10 pages.

(Continued)

*Primary Examiner* — Gabriel I Garcia
(74) *Attorney, Agent, or Firm* — Kilpatrick Townsend & Stockton LLP

(57) ABSTRACT

A metadata generation system utilizes machine learning techniques to accurately describe content of videos based on multi-model predictions. In some embodiments, multiple feature sets are extracted from a video, including feature sets showing correlations between additional features of the video. The feature sets are provided to a learnable pooling layer with multiple modeling techniques, which generates, for each of the feature sets, a multi-model content prediction. In some cases, the multi-model predictions are consolidated into a combined prediction. Keywords describing the content of the video are determined based on the multi-model predictions (or combined prediction). An augmented video is generated with metadata that is based on the keywords.

20 Claims, 6 Drawing Sheets

(56) References Cited

U.S. PATENT DOCUMENTS

2020/0021873 A1* 1/2020 Swaminathan ...... H04N 21/466

OTHER PUBLICATIONS

Arandjelovíc, Relja, et al., "NetVLAD: CNN architecture for weakly supervised place recognition", IEEE Computer Vision and Pattern Recognition (CVPR), May 2, 2016, 17 pages.

Chen, Shaoxiang, et al., "Aggregating Frame-level Features for Large-Scale Video classification", Fudan University et al., Jul. 4, 2017, 6 pages.

Dauphin, Yann N., et al., "Language Modeling with Gated Convolutional Networks", Facebook AI Research, Sep. 8, 2017, 9 pages.

Girdhar, Rohit, et al., "ActionVLAD: Learning spatio-temporal aggregation for action classification", Robotics Institute, Carnegie Mellon University et al., Apr. 10, 2017, 14 pages.

"Google Cloud & YouTube-8M Video Understanding Challenge", Kaggle Inc, retrieved from https://www.kaggle.com/c/youtube8m May 31, 2018, 6 pages.

Hershey, Shawn, et al., "CNN Architectures for Large-Scale Audio Classification", Google, Inc., Jan. 10, 2017, 5 pages.

Hochreiter, Sepp, et al., "Long Short-Term Memory", Neural Computation, vol. 9, No. 8, 1997, 32 pages.

Li, Fu, et al., "Temporal Modeling Approaches for Large-Scale Youtube-8M Video Understanding", Baidu IDL & Tsinghua University, Jul. 14, 2017, 5 pages.

Miech, Antoine, et al., "Learnable pooling with Context Gating for video classification", proceedings of Youtube 8M CVPR17 Workshop, Mar. 5, 2018, 8 pages.

Perronnin, Florent, et al., "Fisher Kernels on Visual Vocabularies for Image Categorization", Xerox Research Centre Europe, Jul. 15, 2007, 8 pages.

Wang, He-Da, et al., "The Monkeytyping Solution to the YouTube-8M Video Understanding Challenge", Tsinghua University, Jun. 16, 2017, 13 pages.

* cited by examiner

MULTI-MODEL TECHNIQUES TO GENERATE VIDEO METADATA

TECHNICAL FIELD

This disclosure relates generally to machine-learning systems capable of generating metadata for videos. More specifically, but not by way of limitation, this disclosure relates to enhancing metadata for searches and other applications by using multiple modeling techniques to determine video content.

BACKGROUND

An increasing number of videos are available online, for informative or artistic purposes. A search computing system that receives a query for a particular type of video content uses metadata and other searchable information to quickly and accurately identify what videos are related to the query. However, videos that are added to available online content may lack a searchable description of the content type depicted by the video, or may have an inaccurate description. Videos lacking a searchable description, or with an inaccurate description, cannot be readily found or accessed by systems or persons searching for videos with a particular type of content.

In some cases, it is possible to augment a video with descriptive metadata that is searchable, or that can be indexed by search engines. For example, a received video includes metadata that is pre-generated. However, the pre-generated metadata may be incomplete, or may include misleading information.

For example, existing computing systems may augment the videos by analyzing a sequence of images included in the video. However, this type of categorization disregards other features of the video, such as audio information, semantic context, existing metadata about the video (e.g., describing the technical qualities of the video file), or other non-visual information represented by the video. Metadata that is generated by existing systems may not accurately describe the content of the video. These descriptions may be inaccurate because, for example, they describe visual content but fail to describe correlations between types of video features, such as correlations between audible and visible features of a video.

It is beneficial to develop techniques to quickly generate accurate metadata for large quantities of videos. It is also beneficial to improve the accuracy of the generated metadata by analyzing multiple types of video features, including combinations of the features.

SUMMARY

According to certain embodiments, video files are enhanced with metadata for searches and other applications. The metadata is generated using multiple modeling techniques to determine video content. For example, an accessed video file includes a video sequence of images. A feature extraction subnetwork extracts, from the video file, a feature set corresponding to a type of video feature. A multi-model learnable pooling subnetwork, with multiple pooling models, generates a set of content predictions based on the extracted feature set. Each of the content predictions in the set includes a vector of labels that is based on a respective one of the pooling models. A metalearning subnetwork generates a multi-model prediction associated with the video feature type, based on the set of content predictions. Based on the keywords, metadata describing content of the video file is generated. The video file is modified to include the metadata. A video search system or other application accesses the metadata when determining a response to a search query.

In some embodiments, multiple feature extraction subnetworks each extract a feature set based on a respective video feature type. Additionally or alternatively, at least one of the extracted feature sets indicates correlations between two or more of the video feature types. Multiple multi-model learnable pooling subnetworks each generate a set of content predictions based on a respective one of the extracted feature sets. Multiple metalearning subnetworks each generate a respective multi-model prediction based on the respective set of content predictions (e.g., content labels, generated metadata), such that each multi-model prediction is associated with one of the respective video feature types. A feature consolidation subnetwork generates a combined prediction based on the multi-model predictions. A classification subnetwork determines keywords describing content of the video file, based on the combined prediction, and metadata describing content of the video file is generated based on the determined keywords. The video file is modified to include the metadata.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
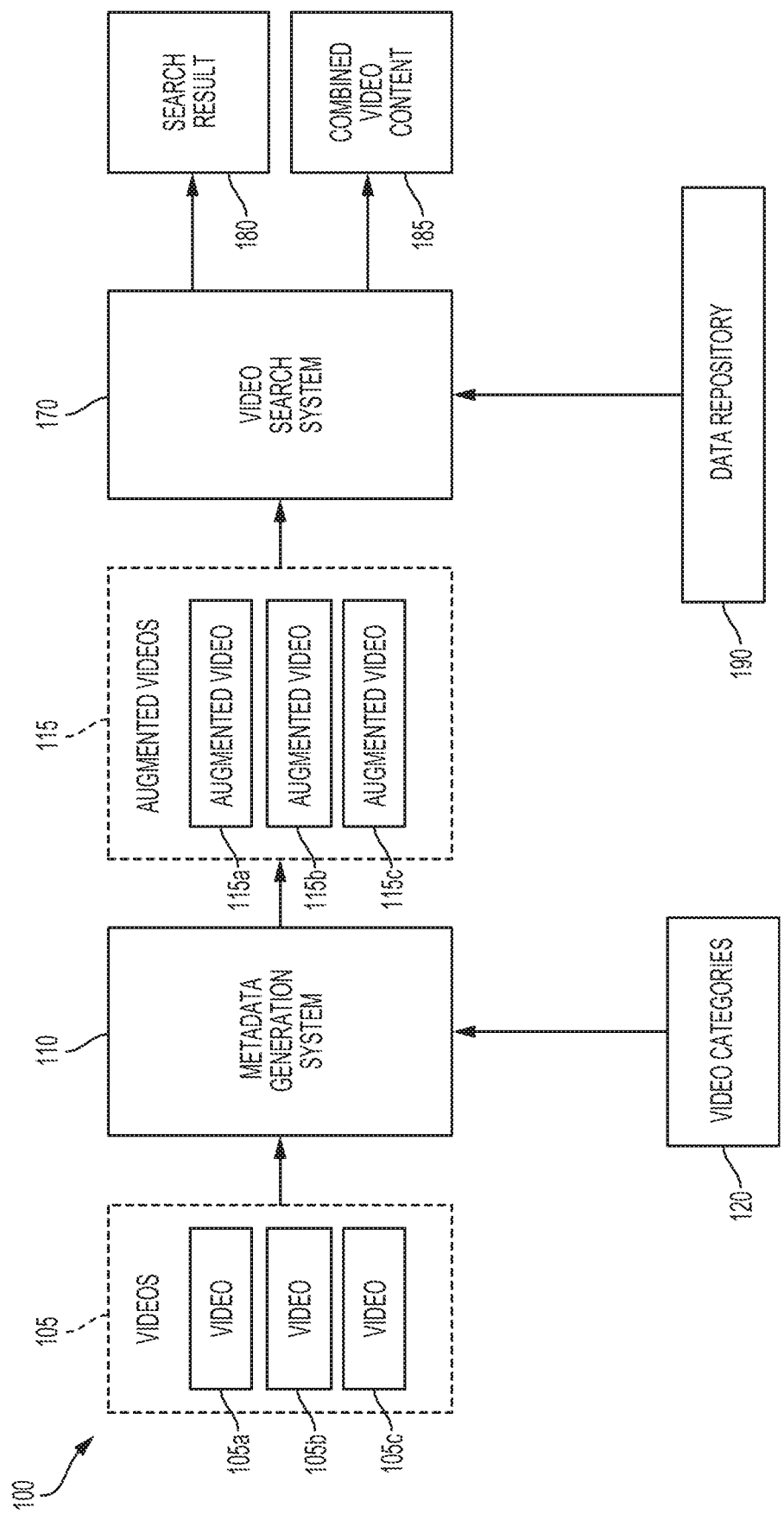
FIG. 1 is a block diagram depicting an example of a computing environment in which augmented videos are generated and combined with other data, according to certain embodiments.

As discussed above, prior techniques for generating metadata for videos do not generate accurate metadata based on multiple types of video features. Certain embodiments described herein provide for augmentation of video files with metadata that is based on multiple modeling techniques. For example, machine learning systems use various modeling techniques for pooling features of a video. The various modeling techniques provide different outcomes based on a given set of features. In some cases, metadata generated based on combinations of these different outcomes from multiple modeling techniques is more accurate than metadata based on a single modeling technique, providing an improvement over existing systems that use a particular modeling technique.

The following examples are provided to introduce certain embodiments of the present disclosure. A metadata generation system, which includes multiple learnable pooling subnetworks, accesses a video file that includes (at least) visual information and audible information. The metadata generation system extracts multiple sets of extracted features by applying multiple feature extraction subnetworks to the video file. For example, each feature extraction subnetwork extracts a particular type of video feature from the video file. In some cases, one or more of the feature extraction subnetworks extract correlated features that are based on correlations between multiple additional features. In an example implementation, a metadata generation system extracts three sets of features from a particular video, where the first of the extracted feature sets has a visual feature type, the second feature set has an audio feature type, and the third feature set has an audio-visual correlation feature type.

Multiple learnable pooling subnetworks included in the metadata generation system determine predictions of the content of the video file. In some cases, each learnable pooling subnetwork determines a content prediction based on a particular set of extracted features. The content prediction includes, in some cases, metadata describing the content of the video file, such as descriptive labels selected from a label space. For example, each learnable pooling subnetwork includes multiple pooling models that each generate a content prediction based on the particular pooling model. The learnable pooling subnetwork provides a multi-model prediction based on the content predictions from the pooling models. In some cases, a combined prediction is based on the multi-model predictions received from each of the learnable pooling subnetworks. For instance, continuing with the example implementation, the metadata generation system provides each of the three extracted feature sets to respective learnable pooling subnetworks. A first multi-model prediction is generated based on the visual feature set, a second multi-model prediction is generated based on the audio feature set, and a third multi-model prediction is generated based on the audio-visual correlation feature set. In addition, a combined prediction is based on the first, second, and third multi-model predictions.

In some embodiments, the metadata generation system determines one or more keywords describing the content of the video file, based on the combined prediction (or the multi-model prediction). The video file is augmented with metadata that is generated from the keywords. The augmented video file, or the generated metadata, can be used in applications that involve determining files based on content. For instance, the metadata can be used by a search engine to return the video file as a result to a relevant search query. Continuing with the example implementation, metadata is generated based on the combined prediction, and a video search system may index or search the metadata to provide a response to a search query.

Additionally or alternatively, certain embodiments described herein provide for generating metadata based on multiple types of video features. For example, metadata that is generated based on correlations between multiple types of video features (e.g., correlations between audio and visual features) is more accurate than metadata based on isolated features, providing an improvement over existing systems that analyze features individually.

As described herein, certain embodiments provide improvements in generating descriptive metadata by automatically applying various rules of a particular type (e.g., various functions captured in one or more neural networks or subnetworks) to identify content of video files, which may facilitate applications such as content searches, detection of events in security footage, etc. In one example, using one or more embodiments described herein can allow for a more accurate prediction of content (e.g., combining predictions from multiple models, determining predictions based on correlated video features). Additionally or alternatively, generating descriptive metadata using the embodiments described herein can allow video content to be indexed for searching, thereby allowing faster or more accurate searching of video application data than would be possible with existing computer systems. Thus, the embodiments described herein provide improvements to computing systems that generate metadata for video files for image searching or other relevant applications that require knowledge of the video content.

As used herein, the terms "video" and "video file" refer to a digital file that is executable by one or more computing systems to provide audio content and visual content understandable by a person watching and listening to the video. For example, a video file includes a sequence of images that are encoded to display in succession, such as on a display device. Additionally or alternatively, a video file includes an audio track that is encoded to produce sound, such as on a speaker device. In some cases, a video file includes additional information, such as user interaction information (e.g., number of times paused, fast forwarding), technical specifications, encoding information, production information (e.g., a video studio name, a copyright notice), historical information (e.g., a posting date, number of times viewed), or any other suitable type of information.

As used herein, the term "feature" refers to a quality of a video, and "feature type" refers to a category of feature. Feature types include, for example, human-perceivable features or non-perceivable features. In some cases, features describe perceivable qualities of the video, such as color, sound, music, graphical edges (e.g., vertical, horizontal, diagonal edges), video resolution, whether the video depicts a human figure, whether the video includes music, or other features that are perceivable by a human viewer. Additionally or alternatively, features describe qualities of the video that are not perceivable by a human viewer, such as encoding details, websites that link to the video, a history of user interactions with the video, mathematical representations of images or sounds included in the video, or other features not intended for human interpretation.

In some cases, features are based on combinations of other features, such as correlated features. Correlated feature types indicate, for example, a relationship between a first type of feature and a second type of feature. Non-limiting examples of correlated feature types include audio-visual correlations, such as a temporal correlation between audio features and visual features of the video; interaction correlations, such as a temporal correlation between visual features and user interaction features (e.g., pausing the video at a particular visual event); technical correlations, such as a correlation between perceivable features and technical features (e.g., cuts in a video corresponding to a change from low-resolution to high-resolution); or any other suitable correlation between two or more feature types.

As used herein, the term "label" refers to data describing content of a video. A label includes, for example, a descriptive term, phrase, or other data that indicates content for a video. In some cases, a label is understandable by a human (e.g., a label including text). Additionally or alternatively, a label includes data that is not intended for human interpretation. In some cases, a label for a video is selected from a group of multiple labels, such as a label space. In some embodiments, a label is included in metadata associated with the described video. For example, a learnable pooling subnetwork determines one or more labels for a particular video based on a model. Additionally or alternatively, a metadata generation module determines metadata for the particular video based on the one or more labels.

As used herein, the term "metadata" refers to descriptive information associated with a video file. In some cases, metadata is not included in the audio or visual content of the video (e.g., not displayed or heard during playback of the video). Additionally or alternatively, metadata includes information that describes characteristics of the video file. For example, metadata describes a characteristic of video content (e.g., "music recording," "sports event"), a technical characteristic of the video (e.g., high-resolution video, three-dimensional video), or any other suitable characteristic of the video. In some cases, metadata is not intended for human interpretation. For example, a computing system configured to respond to search queries analyzes and interprets metadata to determine one or more videos that match terms and the search query.

Referring now to the drawings, FIG. 1 is a block diagram depicting an example of a computing environment 100 in which augmented videos are generated and combined with other data. In the environment 100, a metadata generation system 110 receives one or more video files, such as videos 105a, 105b, and 105c (collectively referred to as videos 105). In some cases, the videos 105 are non-augmented videos, such as video files that do not include metadata describing the content of each video.

In the environment 100, the metadata generation system 110 generates metadata for each of the videos 105, such as by determining one or more keywords that describe the content of each of the videos 105. In some cases, the keywords are determined based on information indicating a set of categories, such as the video categories 120. The metadata generation system 110 generates the metadata for a particular video based on, for example, feature sets extracted from the video. Additionally or alternatively, the metadata generation system 110 generates the metadata based on one or more content predictions indicating a probability of what type of content the particular video includes. In some cases, the metadata generation system 110 generates augmented videos 115a, 115b, and 115c (collectively referred to as augmented videos 115). For example, the metadata generation system 110 generates augmented video 115a by modifying video 105a to include metadata describing the content of video 105a. In addition, the metadata generation system 110 generates the augmented videos 115b and 115c by modifying videos 105b and 105c to include respective metadata describing the respective content of video 105b or 105c. Additionally or alternatively, the metadata generation system 110 generates augmented video 115a by creating a separate data structure that includes the metadata describing video 105a, and associating the video 105a with the separate data object. In addition, the metadata generation system 110 generates augmented videos 115b and 115c by creating data structures that respectively include the metadata describing videos 105b and 105c, and associating the videos 105b and 105c with their respective data structures. For instance, a data structure that includes metadata could be (without limitation) a database record, an XML document, a web object (or other data object), or any other suitable stand-alone (e.g., separate from the video file) data structure. In some cases, a metadata data structure and a video are associated via an additional data object, such as a lookup table in a database.

In some embodiments, the augmented videos 115 are provided to one or more of a data repository 190 or a video search system 170. The data repository 190 is accessible, via one or more data networks, to computing systems that utilize video metadata, such as the video search system 170. In some cases, the data repository 190 includes one or more of the augmented videos 115. Metadata associated with the augmented videos 115 is available to the video search system 170 (or another suitable computing system) for searching, indexing, or retrieving augmented videos 115.

An example of a computing system that utilizes video metadata is the video search system 170 that services search queries (e.g., received from another computing system). Examples of the video search system 170 include (without limitation) one or more servers, virtual machines, distributed computing systems (e.g., a cloud system), or any other suitable computing system configured to service a received query. For example, based on a received search query including one or more search terms, the video search system 170 accesses the data repository 190 to perform the search. The video search system 170 accesses video files (or other file types) that include metadata, such as the augmented videos 115, and compares the metadata to the search terms. In some cases, the video search system 170 accesses metadata data structures that are associated with videos 105a-105c, such as during a search based on one or more of the videos 105a-105c. Video files with metadata that provide a match to the search terms are provided as a search result 180.

In some cases, the video search system 170 generates combined video content 185, such as a video file (or other data object) that includes content from one or more of the augmented videos 115 and additional content of additional video files accessed via the data repository 190. Additionally or alternatively, the video search system 170 generates the combined video content 185 based on the similarity between the metadata of the one or more augmented videos 115 and the metadata of the additional video files.

Figure 2:
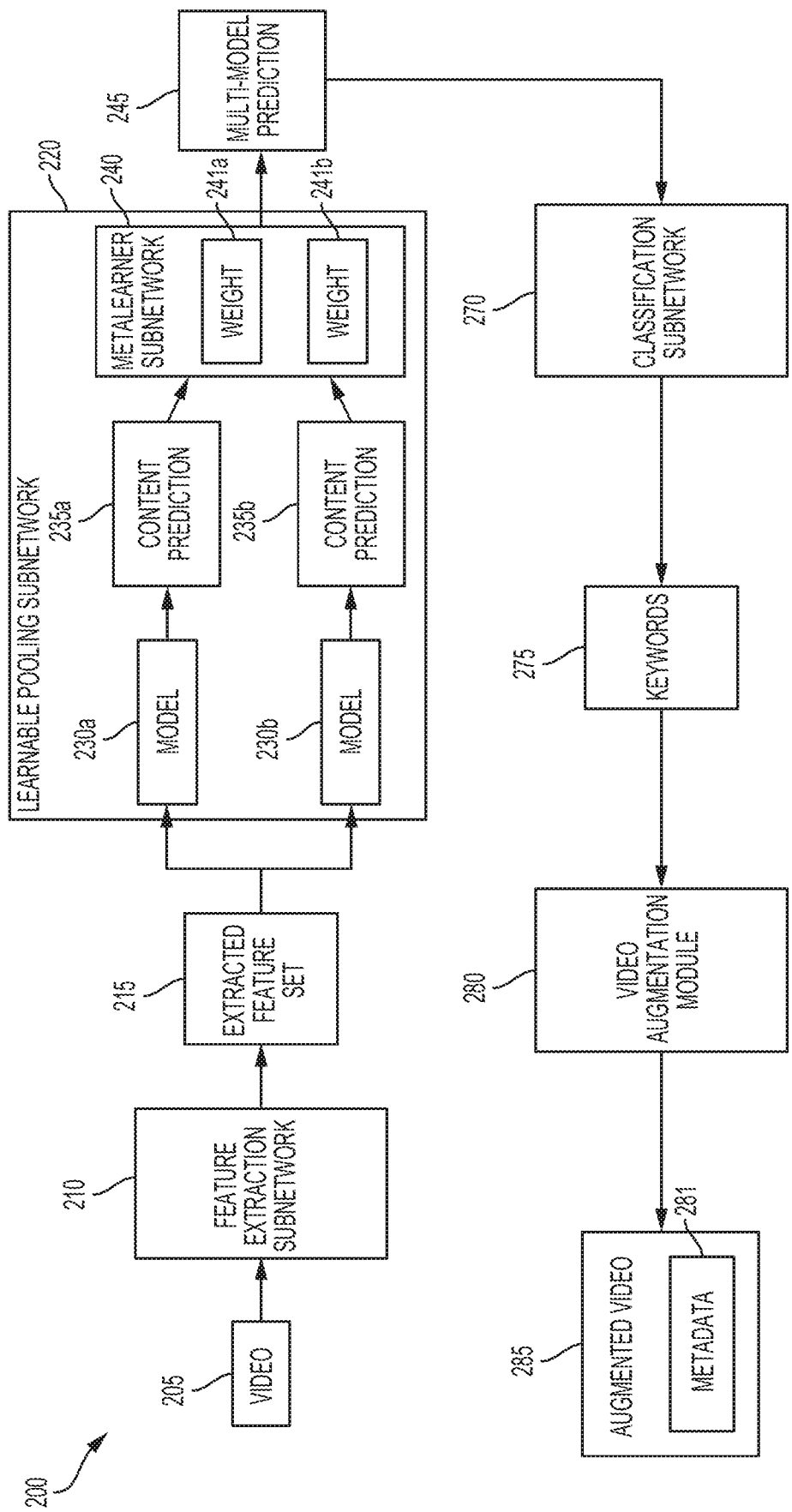
FIG. 2 is a block diagram depicting an example of a computing environment capable of generating a prediction of video content based on multiple predictive models, according to certain embodiments.

FIG. 2 is a block diagram depicting an example of a computing environment 200 that is capable of generating a prediction of video content based on multiple predictive models. In some embodiments, the environment 200 includes one or more neural networks or neural subnetworks, such as a feature extraction subnetwork 210, a learnable pooling subnetwork 220, or a classification subnetwork 270. In some cases, the environment 200 includes a video augmentation module 280. In the environment 200, the neural networks, neural subnetworks, or modules are implemented on one or more computing systems, including (without limitation) physical, virtual, or distributed computing systems, or any suitable combination.

In an embodiment, the feature extraction subnetwork 210 receives one or more video files, such as the video 205. The video 205 includes, for example, visual information and audio information representing the perceivable content of the particular video. In some cases, the video 205 includes (or is associated with) additional information, such as technical specifications, encoding information, production information (e.g., a video studio name, a copyright notice), historical information (e.g., a posting date, number of times viewed), or any other suitable type of information. Additionally or alternatively, the information included in (or associated with) the video 205 corresponds to a type of video feature. For example, visual information included in the video 205 corresponds to a visual type of video feature. Other information, such as audio information or technical specifications, correspond, for example, to other video features types, such as an audio feature type or a technical feature type. In some cases, a video feature type is based on a combination of other features. For example, an audio-visual correlation feature type is based on a combination of audio features and visual features, such as correlations between audio events and visual events in the video 205 (e.g., an audible loud bang that is correlated with a visual sequence of a person dropping a box).

In the environment 200, the feature extraction subnetwork 210 extracts a set of features, such as extracted feature set 215, from the video 205. Extracted features indicate, for example, human-perceivable qualities of the video 205, such as horizontal or vertical edges in the video, whether the video depicts a human figure, whether the video includes music, or other features that are perceivable by a human viewer. Additionally or alternatively, the extracted features indicate qualities of the video 205 that are not human-perceivable, such as encoding details, websites that link to the video, a history of user interactions with the video, mathematical representations of images included in the video, or other features not intended for human interpretation. In some cases, features are based on combinations of other features, such as audio-visual correlation features. In the environment 200, a machine learning neural network included in the feature extraction subnetwork 210 determines one or more features of the video 205. Examples of neural networks for feature extraction include (without limitation) convolutional neural networks, long short-term memory neural networks, or any other suitable neural network.

In some cases, the extracted feature set 215 is based on a particular video feature type associated with the feature extraction subnetwork 210. For example, if the feature extraction subnetwork 210 has a visual feature type, it extracts a set of visual features from the video 205. In some cases, additional feature extraction subnetworks extract additional sets of features, based on the video feature types associated with the additional feature extraction subnetworks.

In the environment 200, the extracted feature set 215 is received by the learnable pooling subnetwork 220. The learnable pooling subnetwork 220 includes multiple models, such as model 230a and model 230b, that each receive the extracted feature set 215. Additionally or alternatively, each of the models 230a and 230b includes a particular technique for modeling a prediction. For example, model 230a includes a first technique for modeling a first prediction, and model 230b includes a second techniques for modeling a second prediction. Modeling techniques include (without limitation) a new trainable generalized vector of locally aggregated descriptors ("NetVLAD"), a residual-less vector of locally aggregated descriptors ("NetRVLAD"), a net Fisher vector ("NetFV"), a recurrent neural network ("RNN"), a long-short-term memory ("LSTM") neural network, or any other suitable modeling technique. The learnable pooling subnetwork 220 is depicted as including two models, model 230a and model 230b, but other implementations are available, such as implementations including additional modeling techniques.

Based on the extracted feature set 215, the models 230a and 230b determine, respectively, a content prediction 235a and a content prediction 235b. The content predictions 235a-b each indicate a prediction of the content of the video 205. In some cases, a content prediction includes one or more labels that are selected based on the modeling technique of the prediction. For example, the content prediction 235a includes a first vector of labels determined by the model 230a, based on the extracted feature set 215. Additionally or alternatively, the content prediction 235b includes a second vector of labels determined by the model 230b, based on the extracted feature set 215. The labels included in the content prediction are selected, for example, from a label space based on features that represent the content of the video 205, as determined by the modeling technique. In some cases, the first vector of labels included in content prediction 235a includes one or more different labels from the second vector of labels included in content prediction 235b. Additionally or alternatively, the content prediction 235a indicates a different prediction of video content from the content prediction 235b.

In the environment 200, the learnable pooling subnetwork 220 includes a meta-learner subnetwork 240. Each of the content predictions 235a and 235b are received by the meta-learner subnetwork 240. Additionally or alternatively, the meta-learner subnetwork 240 generates a multi-model prediction 245 based on a combination of the content predictions 235a and 235b. In some cases, the multi-model prediction 245 is based on a weighted combination of content predictions. For example, the meta-learner subnetwork 240 determines (e.g., via supervised or unsupervised learning) that predictions received from a first model are more accurate than predictions received from a second model. In some cases, a particular model is more or less accurate relative to another model, based on a type of video feature, a quantity of extracted features, or other qualities of the extracted feature set 215 or the video 205. Additionally or alternatively, a particular modeling technique may be more accurate based on a first combination of qualities and less accurate based on a second combination of qualities. For example (and not by way of limitation), the model 230a may be relatively more accurate if the extracted feature set 215 includes audio features and relatively less accurate if the extracted feature set 215 includes visual features. In some cases, determining a relative accuracy of various modeling techniques, such as by the meta-learner subnetwork 240, provides improved analysis of various types of video features, or various video files, or both.

In the example environment 200, the meta-learner subnetwork 240 determines that predictions received from the model 230a are more accurate than predictions received from the model 230b. Based on this determination, the meta-learner subnetwork 240 determines a relatively greater weight 241a that is assigned to the model 230a and a relatively lesser weight 241b that is assigned to the model 230b. Additionally or alternatively, the meta-learner subnetwork 240 generates the multi-model prediction 245 based on a weighted combination that includes the content prediction 235a adjusted by the weight 241a and the content prediction 235b adjusted by the weight 241b. Examples of techniques for meta-learning include (without limitation) learned ensembles, logistic regression, reinforcement learning, or any other suitable technique. Although FIG. 2 depicts the meta-learner subnetwork 240 as included within the learnable pooling subnetwork 220, other implementations are available, such as the meta-learner subnetwork 240 being implemented separate from the learnable pooling subnetwork 220.

In some embodiments, a classification subnetwork 270 receives the multi-model prediction 245. Based on labels included in the multi-model prediction 245, the classification subnetwork 270 determines one or more keywords 275 associated with the content of the video 205. For example, classification subnetwork 270 determines a grouping of the labels (e.g., a grouping within a label space) that is associated with a particular keyword. Based on the determination that the keywords are associated with the grouped labels, the classification subnetwork 270 includes the particular keyword in the keywords 275. In some cases, the classification subnetwork 270 accesses a set of available keywords, such as keywords included in the video categories 120, and determines the keywords 275 based on the set of available keywords. Examples of neural networks for classification include (without limitation) convolutional neural networks ("CNN"), RNN, LSTM neural networks, or any other suitable neural network.

In the environment 200, the video augmentation module 280 receives the keywords 275 that are determined by the classification subnetwork 270. Based on the keywords 275, the video augmentation module 280 generates metadata 281 describing the content of the video 205. In some cases, the metadata 281 includes one or more of the keywords 275. Additionally or alternatively, the metadata 281 includes descriptive information that is based on one or more of the keywords 275. In a non-limiting example, the keywords 275 include the phrases "basketball," "gymnasium," and "hand-held camera," as keywords associated with content of the video 205. Continuing with this example, the video augmentation module 280 generates metadata 281 that includes the keyword "basketball" and the descriptive information "amateur video of indoor basketball," based on the keywords 275.

In some embodiments, the video augmentation module 280 generates an augmented video 285 based on a combination of the video 205 and the metadata 281. For example, the video augmentation module 280 generates a data structure that includes the metadata 281, and associates the data structure with the video 205. In some cases, the video augmentation module 280 modifies the video 205 to include the metadata 281. Additionally or alternatively, the video augmentation module 280 generates the augmented video 285 based on the metadata 281, the video 205 (or a copy thereof), or both. In some cases, the metadata 281 is included in a separate data structure, such as a database record or a stand-alone data object, that is associated with the video 205. In some embodiments, one or more of the augmented video 285 or the metadata 281 are provided to computer system(s) related to responding to search queries, such as the video search system 170 or the data repository 190.

Figure 3:
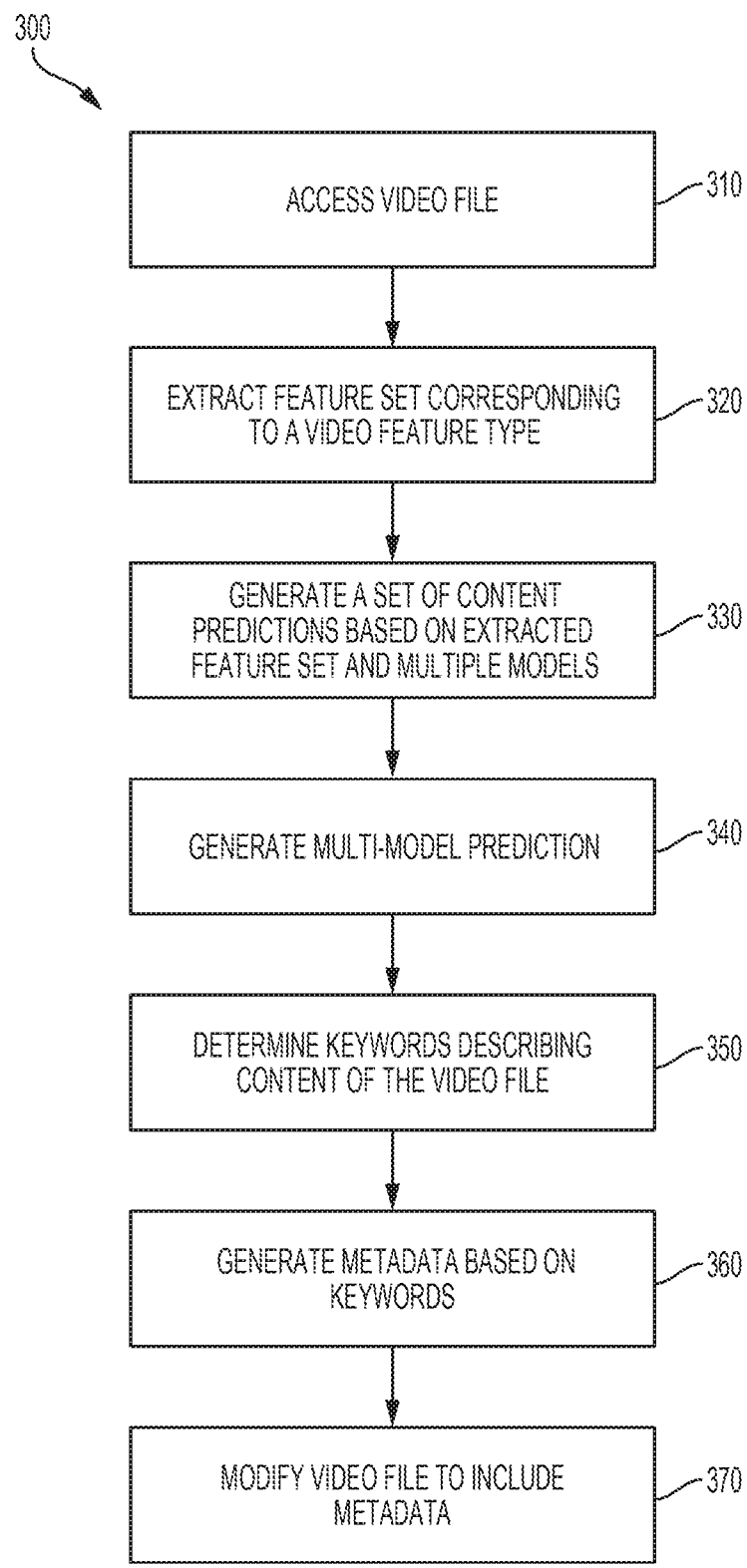
FIG. 3 is a flow chart depicting an example of a process for augmenting a video file with descriptive metadata, according to certain embodiments.

FIG. 3 is a flow chart depicting an example of a process 300 for augmenting a video file with descriptive metadata. In some embodiments, such as described in regards to FIGS. 1-2, a computing device executing a metadata generation system implements operations described in FIG. 3, by executing suitable program code. For illustrative purposes, the process 300 is described with reference to the examples depicted in FIGS. 1-2. Other implementations, however, are possible.

At block 310, the process 300 involves accessing a video file. The video file, such as the video 205, includes visual information and audio information representing the perceivable content of the video depicted in the file. Additionally or alternatively, the video file includes (or is otherwise associated with) additional information that describes qualities of the video file other than perceivable content (e.g., encoding information, production information). In some cases, the video file (or the associated information) indicates one or more types of video features, including correlated features. For example, the video file indicates a temporal correlated feature, such as a temporal correlation between audible features and visual features of the video.

At block 320, the process 300 involves extracting, from the video file, a feature set corresponding to a video feature type. For example, a feature extraction subnetwork 210 extracts one or more features corresponding to a particular feature type, and generates an extracted feature set 215. In some cases, the extracted features indicate qualities of the video that are perceivable to a human viewer, such as visual features, audible features, audio-visual correlation features, or other perceivable feature types. Additionally or alternatively, the extracted features indicate qualities of the video that are not perceivable to a human viewer, such as technical specifications, mathematical representations of the video, or other features not intended for human interpretation. In some embodiments, multiple feature sets are extracted, each of the multiple feature sets corresponding to a particular feature type or particular combination of feature types of the video.

At block 330, the process 300 involves generating multiple content predictions based on the extracted feature set. Additionally or alternatively, each of the multiple content predictions is generated based on one of multiple modeling techniques. For example, each of the multiple models 230a and 230b respectively generate the content predictions 235a and 235b. In some cases, a particular content prediction includes one or more labels, such as a vector of labels, that are determined by a particular modeling technique, based on the set of extracted features. For example, the vector of labels may include labels that represent the content of the video, as indicated by the modeling technique. Additionally or alternatively, the particular content prediction indicates a likelihood of the vector of labels accurately representing the content of the video. For example, the particular content prediction includes a numerical probability of the accuracy of the content prediction. In some embodiments, each of the multiple content predictions includes a respective vector of labels and a respective probability that are based on the respective modeling techniques for the multiple content predictions.

At block 340, the process 300 involves generating a multi-model prediction of the content of the video. In some embodiments, the multi-model prediction is based on a combination of the multiple content predictions associated with the multiple modeling techniques. For example, the meta-learner subnetwork 240 generates the multi-model prediction 245 based on a combination of the content predictions 235a and 235b. In some cases, the multi-model prediction is based on a weighted combination of the multiple content predictions. For example, the meta-learner subnetwork 240 generates the multi-model prediction 245 based on the combination of content prediction 235a adjusted by weight 241a and content prediction 235b adjusted by weight 241b. In some embodiments, the multi-model prediction includes one or more vectors of labels that represent the content of the video. For example, the multi-model prediction includes a multi-model vector with labels selected from the multiple vectors included in the multiple content predictions.

At block 350, the process 300 involves determining one or more keywords describing content of the video file. For example, the classification subnetwork 270 determines keywords 275 based on the multi-model prediction 245. In some cases, the keywords are determined based on groupings of labels included in the multi-model prediction.

At block 360, the process 300 involves generating metadata describing the content of the video file based on the one or more keywords. For example, the video augmentation module 280 generates metadata 281 based on the keywords 275. In some embodiments, the generated metadata includes one or more of the keywords. Additionally or alternatively, the generated metadata includes descriptive information that is based on one or more keywords.

At block 370, the process 300 involves modifying the video file to include the generated metadata. Additionally or alternatively, the video file is associated with a separate data structure that includes the generated metadata. For example, the video augmentation module 280 generates the augmented video 285 based on the video 205 and the metadata 281. In some embodiments, the metadata data structure (or access to the metadata data structure) is provided to a computing system capable of utilizing the generated metadata. Additionally or alternatively, the modified video file or the metadata data structure (or both) are accessed in response to operations related to servicing a search query. For example, the video search system 170 accesses one or more of the data repository 190 or the augmented videos 115, such as in response to receiving a search query from an additional computing system. The video search system 170 compares, for example, metadata of the augmented videos 115 to search terms in the search query. A particular augmented video is given a match score based on a degree of similarity between the search terms and the metadata for the particular augmented video. Responsive to determining that the match score, for example, exceeds a threshold score, the video search system 170 provides the particular augmented video as a result for the search query. In some cases, the search query is based on additional content provided to an additional computing device, such as a video provided for display on a personal computer or mobile device. The search query is based, for example, on metadata associated with the displayed video content. Based on a comparison of the metadata of the augmented videos 115 to search terms describing the metadata of the displayed video, the video file associated with the particular augmented video is selected for additional display (e.g., after completion of the displayed video content).

Figure 4:
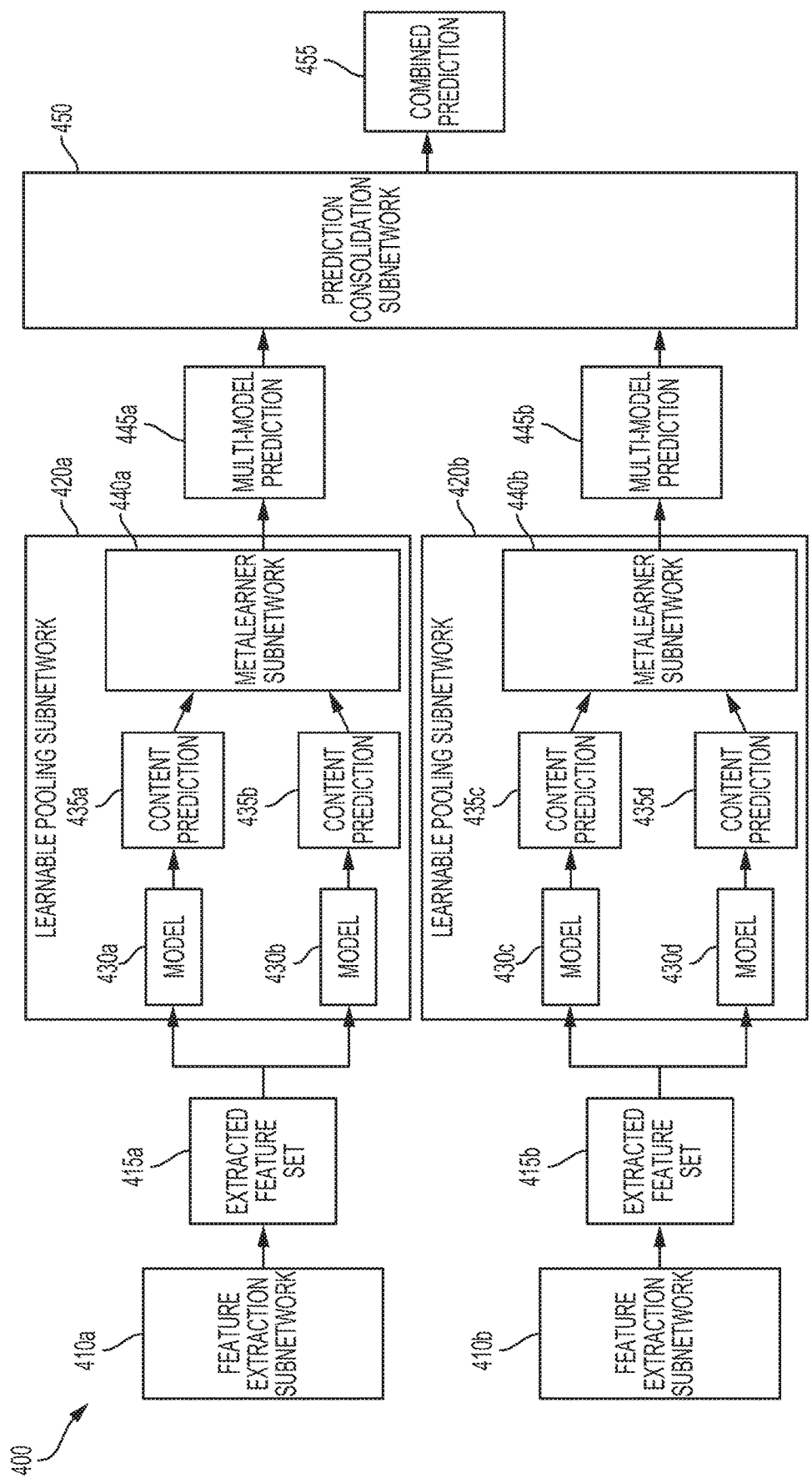
FIG. 4 is a block diagram depicting an example of a computing environment capable of generating a combined prediction of video content based on multiple video feature types, according to certain embodiments.

FIG. 4 is a block diagram depicting an example of a computing environment 400 that is capable of generating a combined prediction of video content based on multiple video feature types. In some embodiments, the environment 400 involves one or more neural networks or neural subnetworks, such as feature extraction subnetworks 410a and 410b, learnable pooling subnetworks 420a and 420b, or a feature consolidation subnetwork 450. In the environment 400, the neural networks, neural subnetworks, or other components are implemented on one or more computing systems, including (without limitation) physical, virtual, or distributed computing systems, or any suitable combination.

In some embodiments, each of the multiple feature extraction subnetworks, including the feature extraction subnetworks 410a and 410b, receive a video file. An example of a video file is video 205, such as described in regards to FIG. 2. In the environment 400, each of the feature extraction subnetworks extract a respective set of features based on the video file. Additionally or alternatively, the sets of features are extracted based on a respective video feature type of the received video file. For example, the feature extraction subnetwork 410a extracts the extracted feature set 415a based on a first video feature type. The feature extraction subnetwork 410b extracts the extracted feature set 415b based on a second video feature type that is different from the first video feature type, such that the extracted feature sets 415a and 415b are different from each other. In some cases, one or more of the extracted feature sets is extracted based on a correlated video feature type.

In the environment 400, each extracted feature set is received by a respective learnable pooling subnetwork that includes multiple modeling techniques for modeling a prediction. For example, the extracted feature set 415a is received by the learnable pooling subnetwork 420a. The extracted feature set 415b is received by the learnable pooling subnetwork 420b. Each of the learnable pooling subnetworks 420a and 420b include multiple models, and each of the multiple models include a particular technique for modeling a prediction. For example, the learnable pooling subnetwork 420a includes model 430a and model 430b, and the learnable pooling subnetwork 420b includes model 430c and model 430d. In some cases, each model included in a particular learnable pooling subnetwork is different from each other model in the particular learnable pooling subnetwork. For example, in the learnable pooling subnetwork 420a, the model 430a is different from model 430b. Additionally or alternatively, each learnable pooling subnetwork includes a similar selection of modeling techniques. For example (and not by way of limitation), the model 430a and 430c each include a first modeling technique, and the model 430b and 430d each include a second modeling technique.

Based on the extracted feature set 415a, the models 430a and 430b respectively determine a content prediction 435a and content prediction 435b. Based on the extracted feature set 415b, the models 430c and 430d respectively determine a content prediction 435c and a content prediction 435d. In some cases, each of the content predictions 435a-d include a respective vector of labels determined based on the corresponding extracted feature set. Additionally or alternatively, each of the content predictions 435a-d include a respective prediction of video content that is based on the corresponding extracted feature set. For example, content predictions 435a and 435b each respectively include a vector of labels and a prediction of video content based on the extracted feature set 415a. Content predictions 435c and 435d each respectively include a vector of labels and a prediction of video content based on the extracted feature set 415b.

In the environment 400, each learnable pooling subnetwork includes a meta-learner subnetwork. In the learnable pooling subnetwork 420a, a meta-learner subnetwork 440a receives the content predictions 435a and 435b. In the learnable pooling subnetwork 420b, a meta-learner subnetwork 440b receives the content predictions 435c and 435d. Each of the meta-learner subnetworks generates a respective multi-model prediction based on a combination of the received content predictions. For example, the meta-learner subnetwork 440a generates the multi-model prediction 445a based on the content predictions 435a and 435b, and the meta-learner subnetwork 440b generates a multi-model prediction 445b based on the content predictions 435c and 435d. Additionally or alternatively, each of the meta-learner subnetworks determines a weight for one or more of the models, as described in regards to FIG. 2.

In some embodiments, each of the multi-model predictions indicate a prediction of video content that is based on the respective extracted feature set. For example, the multi-model prediction 445a indicates a prediction based on the extracted feature set 415a, and the multi-model prediction 445b indicates a prediction based on the extracted feature set 415b. Additionally or alternatively, a combined prediction is determined based on a combination of each of the multi-model predictions. In some cases, combining multi-model predictions that are based on multiple types of video features provides improved accuracy for the combined content prediction.

In the environment 400, the prediction consolidation subnetwork 450 receives the multi-model predictions 445a and 445b. Additionally or alternatively, the prediction consolidation subnetwork 450 generates a combined prediction 455 based on a combination of the received multi-model predictions. For example, the prediction consolidation subnetwork 450 determines a combined vector of labels based on labels that are common to both of the multi-model predictions 445a and 445b. In some cases, the combined vector of labels is included in the combined prediction 455. Additionally or alternatively, the combined prediction 455 indicates a likelihood, such as a numerical probability, of the combined vector of labels accurately representing the content of the received video. Examples of neural networks for combining predictions include (without limitation) CNN, RNN, learned ensembles, or any other suitable neural network.

Figure 5:
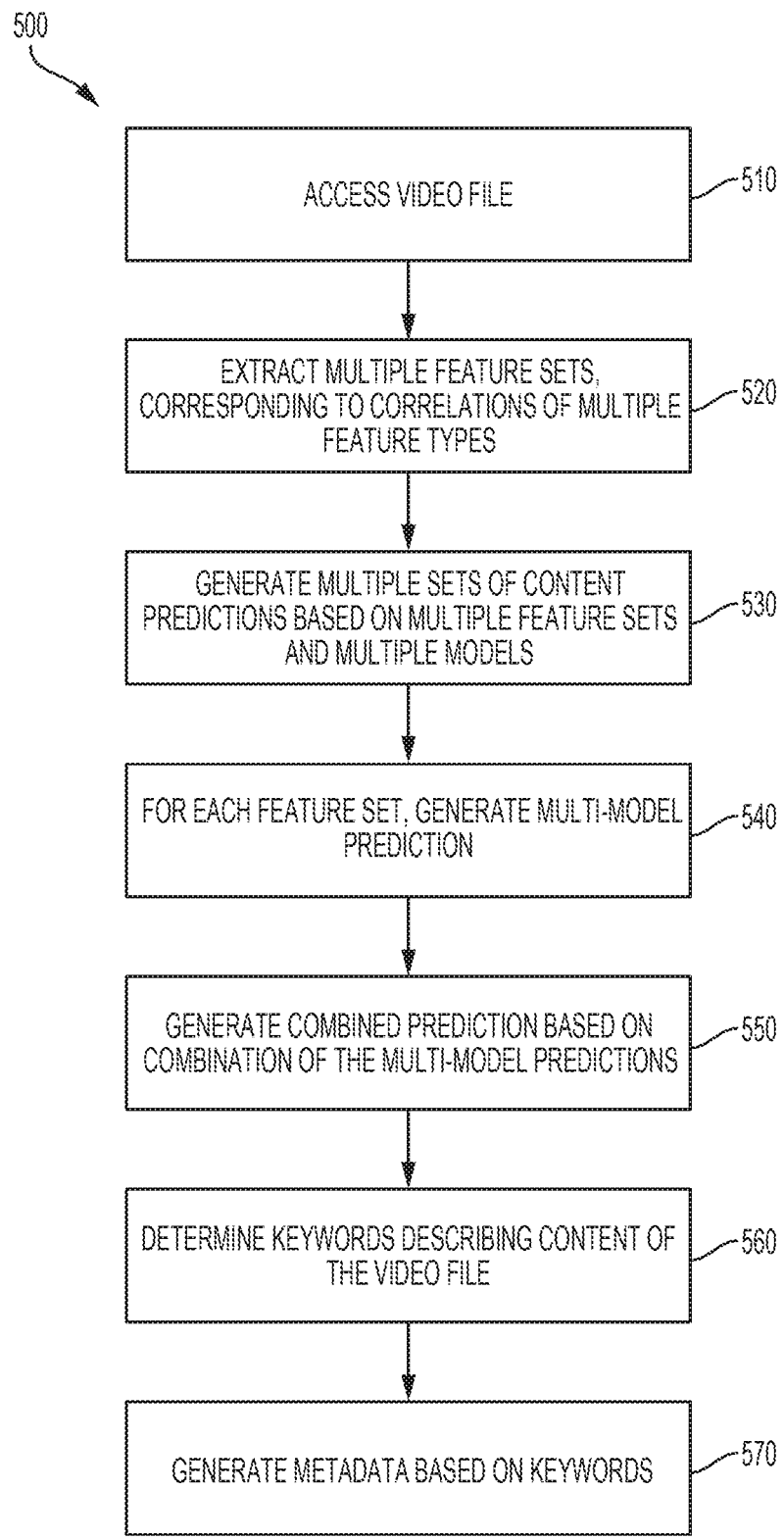
FIG. 5 is a flow chart depicting an example of a process for generating descriptive metadata based on correlated video feature types, according to certain embodiments.

FIG. 5 is a flow chart depicting an example of a process 500 for generating descriptive metadata based on correlated video feature types. In some embodiments, such as described in regards to FIGS. 1-4, a computing device executing a metadata generation system implements operations described in FIG. 5, by executing suitable program code. For illustrative purposes, the process 500 is described with reference to the examples depicted in FIGS. 1-4. Other implementations, however, are possible.

At block 510, the process 500 involves accessing a video file, such as video 205. The video file includes one or more of visual information, audio information, or additional information. In some cases the video file indicates one or more types of correlated video features. For example, the video file indicates a temporal correlated feature, such as a temporal correlation between audible features and visual features of the video, or a temporal correlation between visual features and user interaction features (e.g., pausing the video at a particular visual event). Additionally or alternatively, the video file indicates a technical correlated feature, such as a correlation between visual features and technical features (e.g., changing from low-resolution video to high-resolution video) of the video.

At block 520, the process 500 involves extracting, from the video file, multiple sets features that respectively correspond to correlated feature types. For example, each of the feature extraction subnetworks 410a and 410b extract a set of extracted features based on a respective correlated feature type. In some cases, the extracted features indicate correlations of the video that are perceivable to a human viewer. Additionally or alternatively, the extracted features indicate correlations of the video that are not perceivable to a human viewer.

At block 530, the process 500 involves generating, for each of the extracted feature sets, multiple content predictions. In some cases, the multiple content predictions for a particular one of the extracted feature sets are based on a group of multiple modeling techniques. For example, for the extracted feature set 415a, the multiple models 430a and 430b generate the content predictions 435a and 435b, and for the extracted feature set 415b, the multiple models 430c and 430d generate the content predictions 435c and 435d. In some cases, the multiple content predictions corresponding to a particular one of the extracted feature sets each include a respective vector of labels determined by a respective model, based on the particular feature set. Additionally or alternatively, the multiple content predictions each indicate a likelihood, such as a numerical probability, of the respective vector of labels accurately representing the content of video based on the corresponding correlated feature type.

At block 540, the process 500 involves generating for each of the extracted feature sets, a multi-model prediction of the content of the video. In some embodiments, each of the multi-model predictions is based on a combination of the multiple content predictions associated with corresponding extracted feature set. For example, the meta-learner subnetworks 440a and 440b generate the multi-model predictions 445a and 445b based on the extracted feature sets 415a and 415b. In some cases, each of the multi-model predictions is based on a weighted combination of the multiple content predictions associated with the corresponding extracted feature set. Additionally or alternatively, each of the multi-model predictions includes one or more vectors of labels selected from the multiple vectors included in the multiple content predictions.

At block 550, the process 500 involves generating a combined prediction based on a combination of the multi-model predictions for the multiple extracted feature sets. For example, the feature consolidation subnetwork 450 generates the combined prediction 455 based on a combination of the multi-model predictions 445a and 445b. In some cases, the combined prediction includes a combined vector of labels that is based on the vectors of labels included in the multi-model predictions.

At block 560, the process 500 involves determining one or more keywords describing content of the video file. For example, a classification subnetwork, such as the classification subnetwork 270, determines one or more keywords based on the combined prediction 455. In some cases, the keywords are determined based on groupings of labels included in the combined prediction.

At block 570, the process 500 involves generating metadata describing the content of the video file based on the one or more keywords. For example, a video augmentation module, such as the video augmentation module 280, generates metadata based on the keywords from the combined prediction. In some embodiments, the generated metadata includes one or more of the keywords. Additionally or alternatively, the generated metadata includes descriptive information that is based on one or more of the keywords. In some cases, a video file is modified, or a metadata data structure is created, or both, based on the generated metadata. Additionally or alternatively, the modified video file or the metadata data structure (or both) are accessed in response to operations related to servicing a search query, such as described in relation to FIGS. 1 and 3.

Figure 6:
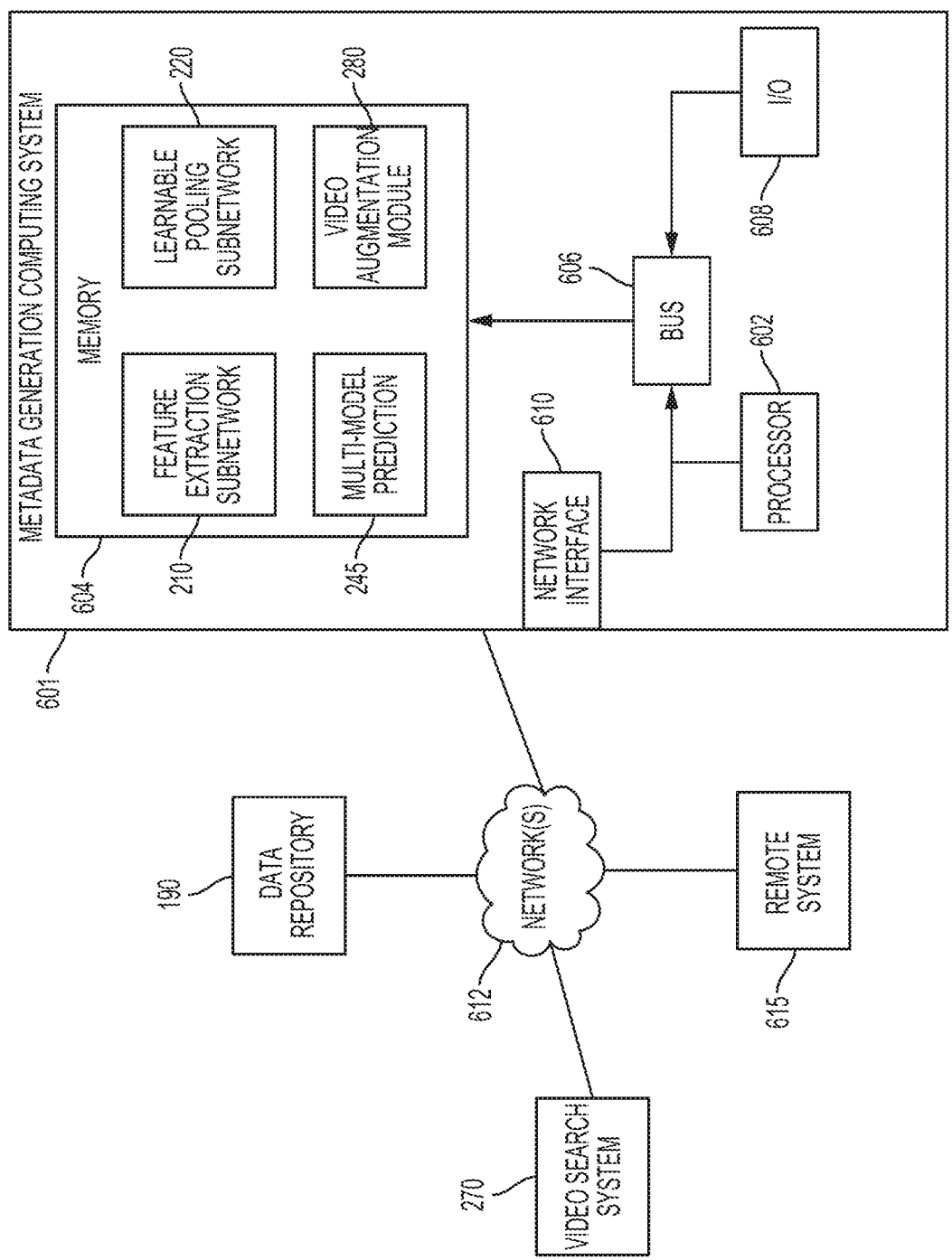
FIG. 6 is a block diagram depicting an example of a computing system for implementing a metadata generation system, according to certain embodiments.

Any suitable computing system or group of computing systems can be used for performing the operations described herein. For example, FIG. 6 is a block diagram depicting a metadata generation computing system 601, according to certain embodiments.

The depicted example of the metadata generation computing system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or other suitable processing device. The processor 602 can include any number of processing devices, including one.

The memory device 604 includes any suitable non-transitory computer-readable medium for storing the feature extraction subnetwork 210, the learnable pooling subnetwork 220, the multi-model prediction 245, the video augmentation module 280, and other received or determined values or data objects, including additional subnetworks. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The metadata generation computing system 601 may also include a number of external or internal devices such as input or output devices. For example, the metadata generation computing system 601 is shown with an input/output ("I/O") interface 608 that can receive input from input devices or provide output to output devices. A bus 606 can also be included in the metadata generation computing system 601. The bus 606 can communicatively couple one or more components of the metadata generation computing system 601.

The metadata generation computing system 601 executes program code that configures the processor 602 to perform one or more of the operations described above with respect to FIGS. 1-5. The program code includes operations related to, for example, one or more of the feature extraction subnetwork 210, the learnable pooling subnetwork 220, the multi-model prediction 245, the video augmentation module 280, or other suitable applications or memory structures that perform one or more operations described herein. The program code may be resident in the memory device 604 or any suitable computer-readable medium and may be executed by the processor 602 or any other suitable processor. In some embodiments, the program code described above, the feature extraction subnetwork 210, the learnable pooling subnetwork 220, the multi-model prediction 245, and the video augmentation module 280 are stored in the memory device 604, as depicted in FIG. 6. In additional or alternative embodiments, one or more of the feature extraction subnetwork 210, the learnable pooling subnetwork 220, the multi-model prediction 245, the video augmentation module 280, and the program code described above are stored in one or more memory devices accessible via a data network, such as a memory device accessible via a cloud service.

The metadata generation computing system 601 depicted in FIG. 6 also includes at least one network interface 610. The network interface 610 includes any device or group of devices suitable for establishing a wired or wireless data connection to one or more data networks 612. Non-limiting examples of the network interface 610 include an Ethernet network adapter, a modem, and/or the like. A remote system 615 is connected to the metadata generation computing system 601 via network 612, and remote system 615 can perform some of the operations described herein, such as performing any of the machine learning algorithms described herein. The metadata generation computing system 601 is able to communicate with one or more of the remote computing system 615, data repository 190, and video search system 170 using the network interface 610. Although FIG. 6 depicts the video search system 170 as connected to metadata generation computing system 601 via the networks 612, other embodiments are possible, including the video search system 170 running as a program in the memory 604 of metadata generation computing system 601.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of augmenting video content with descriptive metadata, the method including operations performed by one or more processors, wherein the operations comprise:
   accessing of a video file including a video sequence of images;
   extracting a feature set corresponding to a video feature type by applying a feature extraction subnetwork to the video sequence;
   generating a set of content predictions by applying a multi-model learnable pooling subnetwork having multiple pooling models to the extracted feature set, wherein each content prediction includes a respective vector of labels that are determined, based on the extracted feature set, by a respective pooling model;
   generating a multi-model prediction by applying a metalearning subnetwork to the set of content predictions, wherein the multi-model prediction is associated with the video feature type and the extracted feature set;
   determining a set of keywords describing content of the video sequence by applying a classification subnetwork to the multi-model prediction;
   generating metadata describing the content of the video sequence using the set of keywords; and
   providing the generated metadata to a data repository in which the generated metadata is associated with the video file.

2. The method of claim 1, the operations further comprising:
   extracting an additional feature set corresponding to a correlated video feature type by applying an additional feature extraction subnetwork to the video sequence, wherein features in the additional feature set indicate correlations between multiple video feature types;
   generating an additional set of content predictions by applying an additional multi-model learnable pooling subnetwork to the additional extracted feature set;
   generating an additional multi-model prediction associated by applying an additional metalearning subnetwork to the additional set of content predictions; and
   generating a combined prediction of the content of the video sequence by applying a prediction consolidation subnetwork to the multi-model prediction and the additional multi-model prediction,
   wherein determining the set of keywords describing the content of the video sequence is based in part on the combined prediction.

3. The method of claim 2, wherein the features in the additional feature set indicate correlations between multiple video feature types selected from: visual features, audible features, audio-visual correlation features, action features, localization features, sentiment features, and video metadata features.

4. The method of claim 1, the operations further comprising servicing a search query by a video search system, wherein servicing the search query comprises:
   receiving, through an input device, the search query comprising one or more search terms;
   determining, by the video search system, a match score by comparing the generated metadata to the one or more search terms from the search query; and
   transmitting the video file to the video search system based on the match score exceeding a threshold.

5. The method of claim 1, the operations further comprising:
   determining, for each of the multiple pooling models, a respective weighting value,
   wherein generating the multi-model prediction includes adjusting each content prediction by the respective weighting value for the respective pooling model.

6. The method of claim 1, the operations further comprising:
   determining one or more parameters associated with the feature extraction subnetwork, wherein the one or more parameters indicate a first quantity of features included in the extracted feature set; and
   adjusting the one or more parameters, such that the adjusted parameters indicate an adjusted quantity of features included in the extracted feature set,
   wherein the adjusted quantity of features is equivalent to a second quantity of features included in the multi-model prediction.

7. The method of claim 1, the operations further comprising modifying the video file to include the generated metadata.

8. A non-transitory computer-readable medium embodying program code for augmenting video content with descriptive metadata, the program code comprising instructions which, when executed by a processor, cause the processor to perform operations comprising:
   accessing of a video file including a video sequence of images;
   extracting multiple feature sets corresponding to respective video feature types by applying multiple feature extraction subnetworks to the video sequence, wherein at least one of the multiple feature extraction subnetworks extracts a correlated feature set indicating correlations between two or more video feature types;
   generating a set of content predictions by applying, to each of the multiple feature sets, a respective learnable pooling subnetwork having at least one pooling model, wherein each of the set of content predictions includes a respective vector of labels determined by the pooling model;
   generating a combined prediction of content of the video sequence by applying a prediction consolidation subnetwork to the set of content predictions;
   determining a set of keywords describing the content of the video sequence by applying a classification subnetwork to the combined prediction;
   generating metadata describing the content of the video sequence using the set of keywords; and
   providing the generated metadata to a data repository in which the generated metadata is associated with the video file.

9. The non-transitory computer-readable medium of claim 8:
   wherein each respective learnable pooling subnetwork includes multiple pooling models and a metalearning subnetwork;
   wherein each pooling model included in the respective learnable pooling subnetwork generates one of a group of modeled predictions; and
   wherein each content prediction in the set of content predictions is a multi-model prediction generated by applying the metalearning subnetwork to the group of modeled predictions.

10. The non-transitory computer-readable medium of claim 9, the operations further comprising:
   determining, for each of the multiple pooling models, a respective weighting value,
   wherein generating the multi-model prediction includes adjusting each of the modeled predictions by the respective weighting value for the respective pooling model.

11. The non-transitory computer-readable medium of claim 9, the operations further comprising:
   determining one or more parameters associated with at least one of the multiple feature extraction subnetworks, wherein the one or more parameters indicate a first quantity of features included in the extracted feature set; and
   adjusting the one or more parameters, such that the adjusted parameters indicate an adjusted quantity of features included in the extracted feature set,
   wherein the adjusted quantity of features is equivalent to a second quantity of features included in the multi-model prediction.

12. The non-transitory computer-readable medium of claim 8, wherein the video feature types are selected from one of: visual features, audible features, audio-visual correlation features, action features, localization features, sentiment features, and video metadata features.

13. The non-transitory computer-readable medium of claim 8, wherein features in the correlated feature set indicate correlations between two or more video feature types selected from: visual features, audible features, audio-visual correlation features, action features, localization features, sentiment features, and video metadata features.

14. A system for augmenting video content with descriptive metadata, the system including one or more processors configured to execute stored instructions to perform one or more operations, the operations comprising:
   a means for accessing of a video file including a video sequence of images;
   a means for extracting a feature set corresponding to a video feature type by applying a feature extraction subnetwork to the video sequence;
   a means for generating a set of content predictions by applying a multi-model learnable pooling subnetwork having multiple pooling models to the extracted feature set, wherein each content prediction includes a respective vector of labels that are determined, based on the extracted feature set, by a respective pooling model;
   a means for generating a multi-model prediction by applying a metalearning subnetwork to the set of content predictions, wherein the multi-model prediction is associated with the video feature type and the extracted feature set;
   a means for determining a set of keywords describing content of the video sequence by applying a classification subnetwork to the multi-model prediction;
   a means for generating metadata describing the content of the video sequence using the set of keywords; and
   a means for providing the generated metadata to a data repository in which the generated metadata is associated with the video file.

15. The system of claim 14, the operations further comprising:
   a means for extracting an additional feature set corresponding to a correlated video feature type by applying an additional feature extraction subnetwork to the video sequence, wherein features in the additional feature set indicate correlations between multiple video feature types;
   a means for generating an additional set of content predictions by applying an additional multi-model learnable pooling subnetwork to the additional extracted feature set;
   a means for generating an additional multi-model prediction associated by applying an additional metalearning subnetwork to the additional set of content predictions; and
   a means for generating a combined prediction of the content of the video sequence by applying a prediction consolidation subnetwork to the multi-model prediction and the additional multi-model prediction,
   wherein the means for determining the set of keywords describing the content of the video sequence is based in part on the combined prediction.

16. The system of claim 15, wherein the features in the additional feature set indicate correlations between multiple video feature types selected from: visual features, audible features, audio-visual correlation features, action features, localization features, sentiment features, and video metadata features.

17. The system of claim 14, wherein the video feature type is selected from one of: visual features, audible features, audio-visual correlation features, action features, localization features, sentiment features, and video metadata features.

18. The system of claim 14, the operations further comprising:
   a means for determining, for each of the multiple pooling models, a respective weighting value,
   wherein the means for generating the multi-model prediction includes adjusting each content prediction by the respective weighting value for the respective pooling model.

19. The system of claim 14, the operations further comprising:
   a means for determining one or more parameters associated with the feature extraction subnetwork, wherein the one or more parameters indicate a first quantity of features included in the extracted feature set; and
   a means for adjusting the one or more parameters, such that the adjusted parameters indicate an adjusted quantity of features included in the extracted feature set,
   wherein the adjusted quantity of features is equivalent to a second quantity of features included in the multi-model prediction.

20. The system of claim 14, modifying the video file to include the generated metadata.

* * * * *